Figure 1:
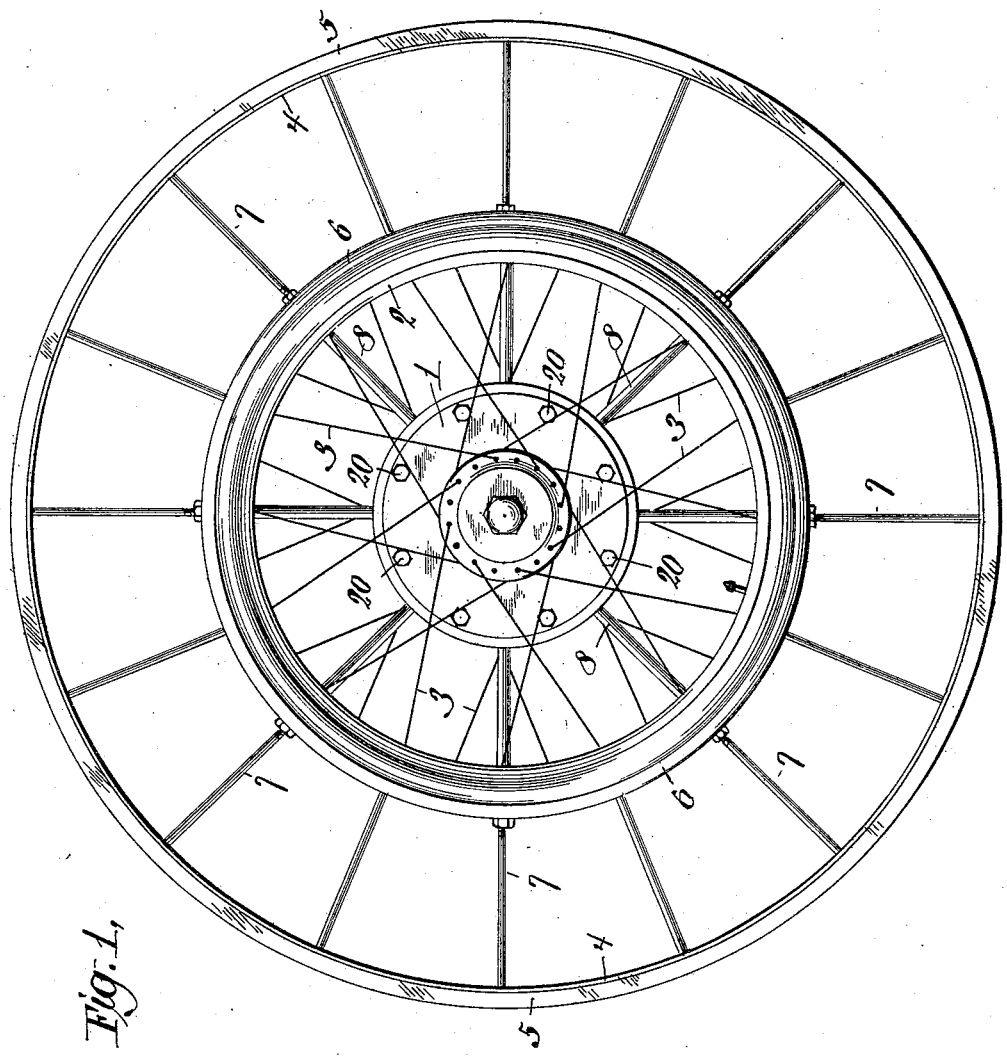

No. 672,908. Patented Apr. 30, 1901.
G. S. LEE.
VEHICLE WHEEL.
(Application filed Dec. 13, 1900.)

(No Model.) 3 Sheets—Sheet 1.

WITNESSES: INVENTOR
George S. Lee
BY
HIS ATTORNEY

No. 672,908. Patented Apr. 30, 1901.
G. S. LEE.
VEHICLE WHEEL.
(Application filed Dec. 13, 1900.)
(No Model.) 3 Sheets—Sheet 2.

WITNESSES:
Harry F. Goss
Harry S. Marsh

INVENTOR
George S. Lee
BY
D. Howard Hayward
HIS ATTORNEY

No. 672,908.  
G. S. LEE.  
VEHICLE WHEEL.  
(Application filed Dec. 13, 1900.)
Patented Apr. 30, 1901.
(No Model.)
3 Sheets—Sheet 3.
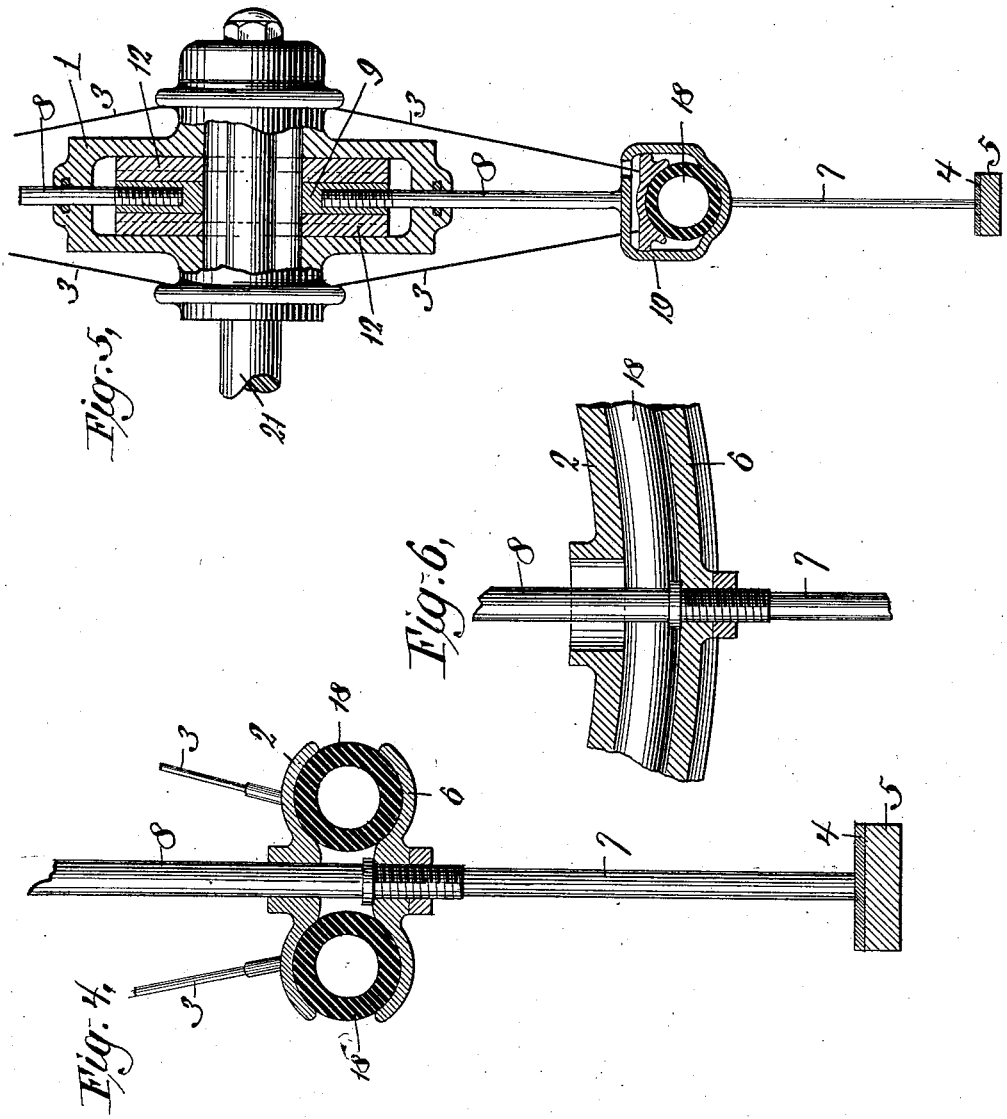
WITNESSES:
INVENTOR  
George S. Lee  
BY  
L. Howard Stafford  
HIS ATTORNEY

UNITED STATES PATENT OFFICE.

GEORGE S. LEE, OF HAWTHORNE, NEW JERSEY, ASSIGNOR TO THE WHEEL WITHIN WHEEL COMPANY, OF NEW JERSEY.

VEHICLE-WHEEL.

SPECIFICATION forming part of Letters Patent No. 672,908, dated April 30, 1901.

Application filed December 13, 1900. Serial No. 39,699. (No model.)

*To all whom it may concern:*

Be it known that I, GEORGE S. LEE, a citizen of the United States of America, and a resident of Hawthorne, county of Passaic, and State of New Jersey, have invented certain new and useful Improvements in Vehicle-Wheels, of which the following is a specification, reference being had to the accompanying drawings, forming a part thereof.

My invention relates particularly to cushioned wheels in which the outside tire or rim is unyielding, but in which the cushioning device is between the outside tire or rim and the hub portion of the wheel.

My invention consists in the provision in a wheel of two members, one member provided with a hub portion and the other with the outside rim or tire, a cushioning device between the said members, and means for permitting relative movement of the members in the plane of rotation of the wheel, but whereby the said members are locked against rotation relatively of each other.

The objects of my invention are to obtain all the advantages of the cushioned or pneumatic outer tire and at the same time protect such cushioning device as I employ from injury incident to its use upon streets or roads. In this manner I provide a wheel which is well adapted to a heavy class of vehicles, such as those of an automobile character. In cushioned or pneumatic wheels of the ordinary construction the weight of the vehicle is such that the tires are punctured by coming in contact with sharp substances of the road-bed; and one object of my invention is to protect the cushioning device by not bringing it in contact with the road-bed.

A further object of my invention in so disposing of the cushioning device between the wheel members is that by such arrangement a greater portion of the cushioning device is employed at a time to support the load than is employed when the cushioning device is in contact with the road-bed itself. The pressure and strain are better distributed, and it is possible to employ a lighter cushioning device than would otherwise be practicable.

Another object of my invention is the further distribution of pressure and strain in the employment of a plurality of flexible inflatable tubes as a cushioning device and in so dividing up the cushioning device to provide that should any accident happen to one portion thereof the entire wheel would not be immediately disabled.

My invention further consists in certain novel details of construction and combination of parts, as shall hereinafter be more fully set forth.

I shall now proceed to describe a vehicle-wheel embodying my invention and will then point out the novel features in the claims.

Figure 3:
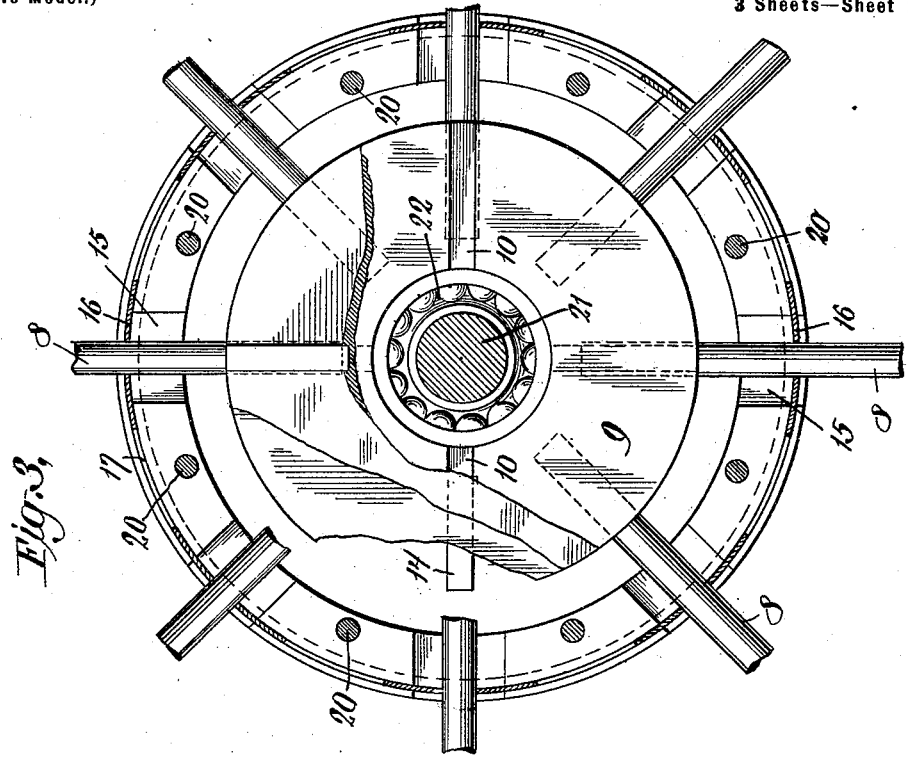
Figure 2:
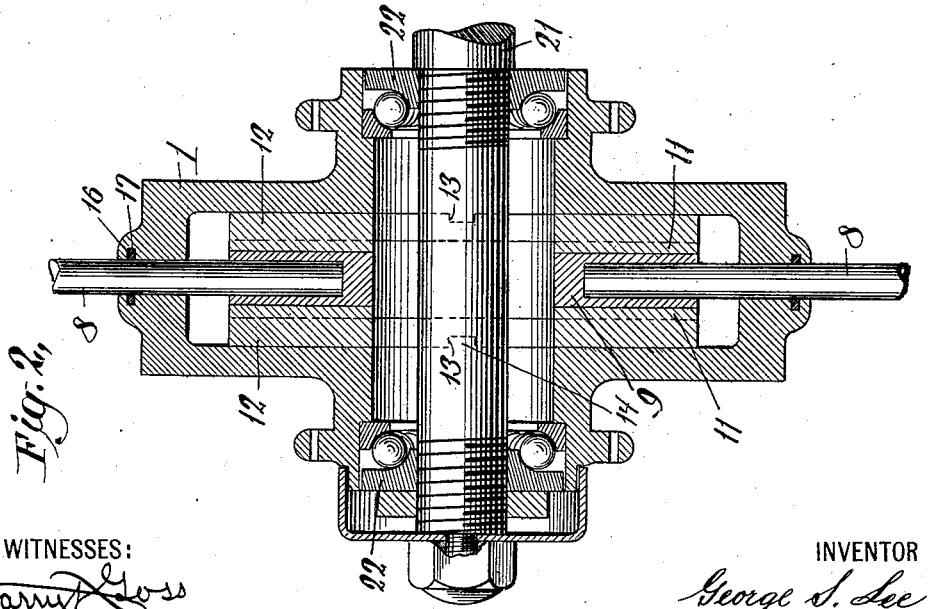

In the drawings, Figure 1 is a side elevation of a vehicle-wheel embodying my invention. Fig. 2 is a central transverse sectional elevation through the hub portion. Fig. 3 is a partial central section of the parts shown in Fig. 2 and a partial side elevation of the same, certain parts being broken away in order to better illustrate other parts. Fig. 4 is a detail transverse section through the cushioning device and the outer rim or tire. Fig. 5 is a detail view of a portion of a wheel in partial central transverse section, showing a modification. Fig. 6 is a detail sectional view taken on the line 6 6 of Fig. 4.

My improved wheel comprises two members, one carrying the hub portion, and which for purposes of this specification I will designate as the "hub member," and the other carrying the outer rim or tire, and which for purposes of this specification I will term the "tire member."

The hub member comprises the hub proper, designated in the drawings by the reference character 1, and a rim 2, surrounding same. The hub 1 and rim 2 are rigidly secured together by suspension-spokes 3, the said spokes being secured to the rim 2 in the ordinary manner and to flanges with which the hub 1 is provided in a manner common to this type of wheel.

The tire member comprises an outer metallic rim or tire 4, which may or may not have a rubber tire 5 secured thereon, a rim 6 of smaller diameter than the tire-rim 4, and a plurality of spokes 7, which are secured to both the said rims 6 and 4. Certain of the spokes (7 in this case the alternate spokes) have inwardly-extending portions 8, which pass freely through slotted openings in the rim 2 and which enter into and engage with the hub 1. In the construction herein shown the ends of the spokes are secured together in a floating plate or ring 9. The floating plate 9 in such case becomes an integral part of the tire member. The said floating plate 9 has a groove or recess 10 arranged on either side thereof, which is adapted to receive the tongues 11 of intermediate guide-plates 12, arranged within the hub 1 and between the opposite sides of the floating plate 9 and the side walls of the said hub. The intermediate guide-plates have grooves 13, similar to the grooves 10 in the floating plate 9 and arranged at right angles to the tongues 11, carried by the said plates, and on the opposite sides thereof. The grooves 13 engage with and receive tongues 14, projecting inwardly from the said walls of the hub 1. The intermediate guide-plates 12 in their connections with the floating plate 9 and hub 1, as just described, will permit a relative movement between the floating plate 9 and the hub 1, and hence between the tire member and the hub member in right lines in the plane of rotation of the wheel, but will positively lock the parts against relative rotation. When moving in a line parallel with the tongues 11, the floating plate 9 will be moved backward and forward, while the intermediate guide-plates 12 will remain stationary. When moving at right angles to such last-named movement, the intermediate guide-plates 12 will be carried by the floating plate 9 and they will together move backward and forward in a line with the tongues 14. Movements backward and forward in any right line in the same plane with these two movements will be permitted by a compound movement of the said floating and guide plates. Such movements, however, will be permitted only in right lines, and relative rotation will be positively prevented.

The holes in the outer portion of the hub through which the extensions 8 of the spoke 7 pass to the interior are slotted, as at 15, as are also the holes in the rim 2 through which they pass, in order to permit the desired relative movement between the spokes and the hub member. Dust-guards 16 are carried by the spoke extensions and close the said slotted holes 15. The spoke extensions pass freely through holes in the dust-guards, and the dust-guards are slidably mounted in grooves 17 in the hub. In this way the dust-guards will not impede the desired movement of the spoke extensions in the slots 15, but at the same time will close the said slots at all times against the admission of dust and dirt.

The cushioning device herein employed comprises two hollow flexible inflatable tubes 18. These are clearly shown in cross-section in the detail Fig. 4. These tubes may be inserted in a deflated condition between the rims 2 and 6 and may be inflated when in position in a manner well known. The spoke extensions 8 of the spoke 7 may conveniently pass down between these tubes 18, as clearly shown in this figure, or if a single tube is employed as a cushioning device the spoke extensions may conveniently pass around the tube, as shown at 19 in the modified structure illustrated in Fig. 5.

For purposes of manufacture the hub 1 may conveniently be made in two parts and united by means of bolts and nuts 20. The plate 9 may also be made in two parts, if desired. In the drawings herewith it is shown as an integral piece. If made in two parts, they will be rigidly secured together.

A vehicle-axle is shown at 21 in the drawings, and suitable ball-bearings 22 are disposed between the axle and the hub. These ball-bearings form no part of this invention, and further detailed description is hence unnecessary.

From the foregoing description it will be seen that in the operation of a wheel when pressure is applied to the tire-rim 4 the same will be transmitted through the spokes to the rim 6 and there cushioned by the cushioning device interposed between the said rim and the rim 2. By reason of the fact that the cushioning device is disposed between two substantially parallel surfaces the shock will be well distributed, the said distribution being far better than if the cushioning device were between the curved rim-tire of the wheel and the substantially straight surfaces of the road-bed. It will be further seen that by this construction I am enabled to use a plurality of tubes forming a cushioning device, while retaining a single tread for the wheel. It will also be obvious that if for any reason one portion of the cushioning device becomes disabled the remaining portion will tend to support the wheel until the same can properly be repaired. Again, in view of the disposition and arrangement of the cushioning device the same is exposed to a minimum of pressure and effectually protected against injury by contact with the road-bed, so that the wheel may be utilized to sustain heavy loads. The contact portion with the road-bed is no more liable to injury than that of an ordinary solid tire, while all the advantages in the cushioning and elastic effects of a pneumatic or cushion tire are secured in the present invention.

I wish it to be understood that I do not desire to limit myself to the precise details of construction and combination of parts as herein shown and described, as the same may obviously be varied within wide limits without departing from the spirit and scope of my invention.

What I claim is—

1. A wheel comprising two members, one member provided with a hub and the other member with a tire rim, a flexible inflatable tube, forming a cushioning device, arranged between said members, and means for permitting relative movement of the members, in the plane of rotation of the wheel, but for locking the said members against rotation relatively of each other.

2. A wheel comprising two members, one member provided with a hub and the other member with a tire rim, a plurality of flexible inflatable tubes, forming a cushioning device, arranged between said members, and means for permitting relative movement of the members in the plane of rotation of the wheel, but for locking the said members against rotation relatively of each other.

3. A wheel comprising two members, one member provided with a hub and the other member with a tire rim, a cushioning device between said members, and a plurality of spokes secured to said last-named member, and engaging with, but having a relative movement of, said first-named member, and means for locking the members against rotation relatively of each other in either direction.

4. A wheel comprising two members, one member provided with a hub portion, and a rim surrounding the said hub portion and secured thereto, and the other member provided with a tire-rim and a rim of smaller diameter arranged within same and secured thereto, a cushioning device arranged between the inner rim of the last-said member, and the rim of the first-said member, and means for locking the said members against rotation relatively of each other.

5. A wheel comprising a hub, a stationary rim secured to and supported by said hub, a movable rim, a cushioning device disposed between the said rims, a tire-rim, spokes secured to said tire-rim and said movable rim, said spokes engaging with said hub, but having a relative movement therewith, and means for locking the hub and stationary rim against rotation relatively of the movable rim and tire-rim in either direction.

6. A wheel consisting of two members, one member comprising a hub, a rim surrounding said hub, and a plurality of spokes connecting said rim and said hub, another member comprising a tire-rim, a rim of smaller diameter arranged within same, and a plurality of spokes secured to the said rims and having ends which extend inwardly within the said rims and engage with the first-said member, and a cushioning device arranged between the inner rim of the last-said member and the rim of the first-said member.

7. A wheel comprising two members, one within the other, and a cushioning device arranged between the said members, and a floating plate engaging with both the said members, whereby right-line relative movement thereof, in the plane of rotation of the wheel is permitted, and means whereby relative rotary movement of the members is prevented.

8. A wheel comprising a hub, a movable rim surrounding said hub, a cushioning device between said rim and said hub, spokes secured to said movable rim and having ends extending into said hub, and a floating plate secured to the inner ends of said spokes and engaging with the said hub, and means whereby rotation of the said plate relatively thereto is prevented.

9. A wheel comprising a hub, a movable rim surrounding the hub, a cushioning device between the said rim and the said hub, a tire-rim surrounding the said movable rim, spokes secured to the movable rim and to the tire-rim and having ends extending into the hub, a plate secured to inner ends of the said spokes, the said plate having a floating connection with the said hub.

10. A wheel comprising a hub, a movable rim surrounding the hub, a cushioning device between the said rim and the said hub, a tire-rim surrounding the said movable rim, spokes secured to the movable rim and to the tire-rim and having ends extending into the hub, a floating plate secured to the inner ends of the said spokes, and an intermediate guide-plate between the said floating plate and the said hub.

11. A wheel comprising a hub, a stationary rim secured thereto and supported thereby, a cushioning device carried by said rim, a movable rim engaging with said cushioning device, a tire-rim secured to said movable rim, spokes secured to said movable rim and extending inwardly into said hub, a floating plate secured to the inner end of said spoke and an intermediate guide-plate between said floating plate and said hub.

12. A wheel comprising a hub, a movable rim surrounding said hub, a cushioning device between said rim and said hub, spokes secured to said movable rim and having ends extending into said hub through slots therein, means for permitting right-line movement of the said rim and spokes relatively to the hub, and dust-guards inclosing the said hub-slots.

13. A wheel comprising a hub, a movable rim surrounding said hub, a cushioning device between said rim and said hub, spokes secured to said movable rim and having ends extending into said hub through slots therein, means for permitting right-line movement of the said rim and spokes, relatively to the hub, and movable dust-guards inclosing the said hub-slots.

14. A wheel comprising a hub, a movable rim surrounding said hub, a cushioning device between said rim and said hub, spokes secured to said movable rim and having ends extending into said hub through slots therein, means for permitting right-line movement of the said rim and spokes relatively to the hub, and movable dust-guards, mounted in the hub and carried by the spokes, inclosing the said hub-slots.

GEORGE S. LEE.

Witnesses:
D. HOWARD HAYWOOD,
HARRY F. GOSS.